United States Patent [19]
Jones

[11] 3,766,734
[45] Oct. 23, 1973

[54] DUAL FUEL CONTROL SYSTEM FOR A GAS TURBINE

[75] Inventor: Robert M. Jones, Schenectady, N.Y.

[73] Assignee: General Electric Company, Schenectady, N.Y.

[22] Filed: Mar. 1, 1972

[21] Appl. No.: 230,679

[52] U.S. Cl............... 60/39.28 R, 62/50, 62/51
[51] Int. Cl. ............................................. F02c 9/08
[58] Field of Search............. 60/39.28 R; 62/50, 62/51, 52

[56] References Cited
UNITED STATES PATENTS

| 3,577,877 | 5/1971 | Warne | 60/39.28 R |
| 2,637,334 | 5/1953 | Starkey | 60/39.28 R |
| 2,933,894 | 4/1960 | Johnson | 60/39.28 R |
| 3,387,462 | 6/1968 | Bauger | 60/39.28 R |
| 3,517,679 | 6/1970 | Williamson | 60/39.28 X |

Primary Examiner—Clarence R. Gordon
Attorney—William C. Crutcher et al.

[57] ABSTRACT

A fuel control system for a gas turbine for simultaneously burning a liquid fuel and a gas fuel according to the availability of and in preference for the gas fuel. In the embodiment shown, the gas turbine serves as a marine propulsion system for a tanker carrying liquid natural gas as a cargo with gas "boil-off" serving as a gaseous fuel source of variable availability. In addition to continuously modulating the fuel ratio based on gas flow rate availability, the system also allows operation on dual fuel at a selected ratio between fuels or automatic transfer to single fuel mode when either fuel falls below a minimum value.

8 Claims, 5 Drawing Figures

DUAL FUEL CONTROL SYSTEM FOR A GAS TURBINE

BACKGROUND OF THE INVENTION

This invention pertains generally to dual fuel systems for gas turbines designed to simulatneously burn gas and liquid fuels. More particularly, it relates to a system for continuously adjusting the ratio between fuels in preference to one fuel of limited flow rate availability which varies over time.

Gas turbine dual fuel systems, in which the proportion between two fuels to be burned simultaneously can be selected by the operator, are well known in the art. Exemplary of such systems are U.S. Pat. No. 2,637,334 issued to N. E. Starkey and U.S. Pat. No. 2,933,894 issued to R. M. Johnson and A. Loft. Dual Fuel systems are also known which incorporate means providing a preference for one fuel over another with the second fuel supplied only after a preselected quantity of the first fuel is being used. The aforesaid patents are assigned to the present assignee.

Although the foregoing systems are suitable when the total fuel requirements do not change drastically or when the preferred fuel availability does not change too much, improved means of control are required in some systems to provide the most economical operation in cases where there are substantial changes in preferred fuel availability and in total fuel requirements. An example is found in a tanker carrying liquefied natural gas (LNG). The otherwise wasted "boil-off" from the LNG cargo is a preferred fuel to burn in a gas turbine serving as propulsion system for the vessel, with the balance made up of liquid distillate or residual fuel. Total fuel requirements for the gas turbine also vary substantially, as when the ship is at sea, or maneuvering.

Accordingly, one object of the present invention is to provide an improved dual fuel control system for a gas turbine which will utilize a preferred fuel of limited availability to the maximum extent under conditions of varying fuel requirements and preferred fuel availability.

Another object of the invention is to provide in such a dual fuel control system additional provisions for single fuel operation, selectable fuel ratio operation, and transfer to one fuel when the other fuel is insufficient in quantity.

SUMMARY OF THE INVENTION

Briefly stated, the invention comprises means to provide a first preferred fuel control signal which is the lower of two signals, one representing desired total fuel and the other representing a preferred fuel flow rate availability. A second fuel control signal is obtained by subtracting the first fuel control signal from the total fuel control signal. Logic input signals to the system convert it to a single fuel mode or a selectable fixed ratio dual fuel mode.

DRAWING

The subject matter which is regarded as the invention is particularly pointed out and distinctly claimed in the concluding portion of the specification. The invention, however, both as to organization and the method of practice, together with further objects and advantages thereof, may best be understood by reference to the following description taken in connection with the accompanying drawing in which:

FIG. 1 is a simplified, schematic view of the invention as applied to a gas turbine propulsion turbine for an LNG tanker, FIG. 2 is a block diagram of a simplified version of the invention, FIG. 3 is a circuit diagram corresponding to the block diagram of FIG. 2, FIG. 4 is a block diagram of the complete dual fuel system used for the FIG. 1 arrangement, and FIG. 5 is a circuit diagram corresponding to FIG. 4.

DESCRIPTION OF THE PREFERRED EMBODIMENT

Figure 1:
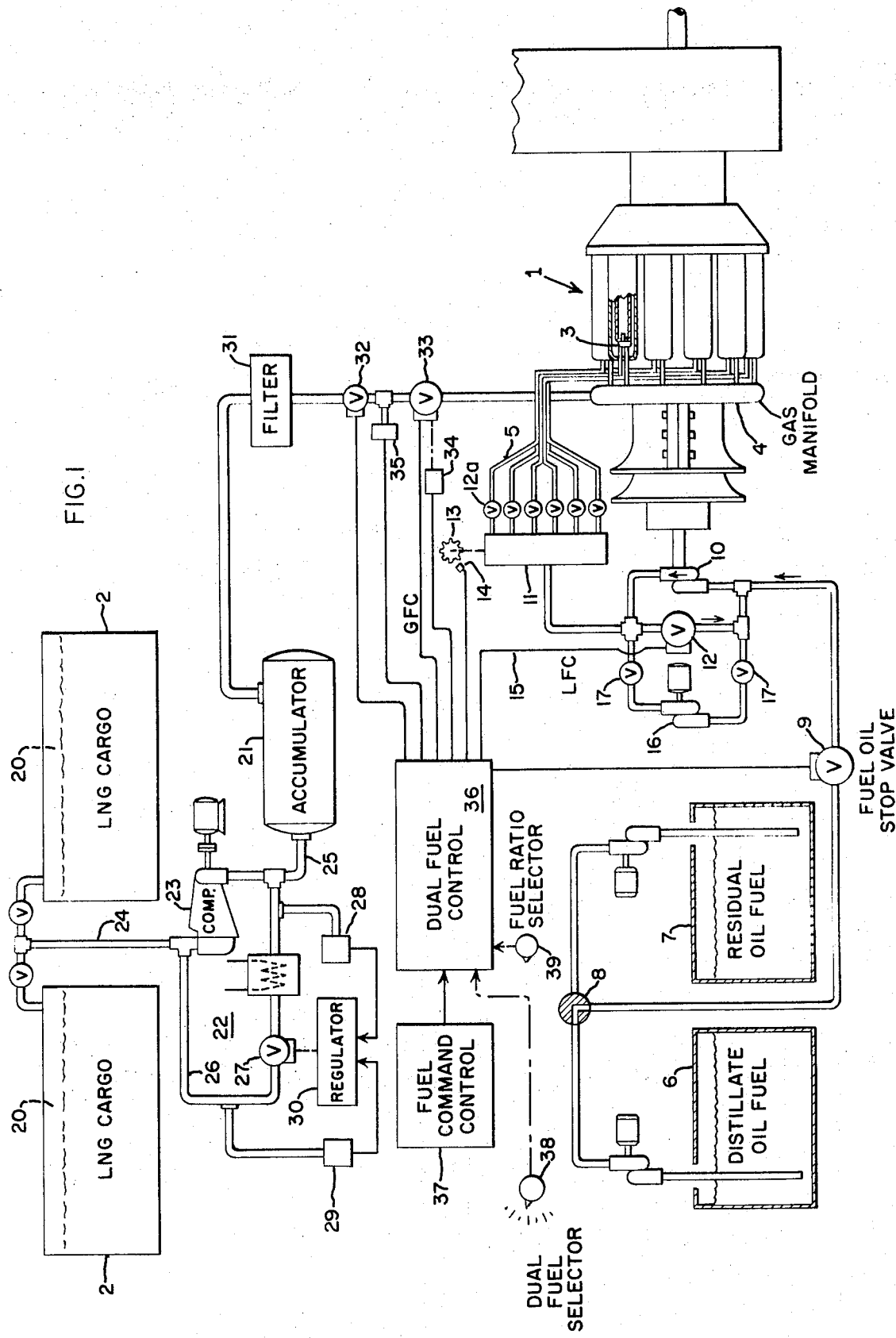

Referring to FIG. 1 of the drawing, a gas turbine shown generally at 1 is adapted by means of gearing and reversible pitch screw (not shown) to drive a vessel. The vessel in the embodiment shown is a tanker carrying liquefied natural gas by means of a number of LNG cargo tanks 2. The gas turbine combustion system is adapted by means of dual fuel nozzles 3, which are well known in the art, to burn gaseous fuel from a manifold 4 or to burn liquid fuel from individual liquid supply pipes 5 connected separately to nozzles 3.

The liquid fuel supply system in the arrangement shown provides a choice of two liquid fuels, one from a distillate oil supply tank 6 or a residual or "Bunker C" fuel tank 7. A liquid fuel transfer valve 8 allows the selection, and a fuel oil stop valve 9 provides for emergency liquid fuel shutoff in the event of emergency.

The normal means of supplying liquid fuel to the combustion chambers when the turbine is rotating comprises a shaft-driven pump 10 supplying a "free-wheeling" flow divider 11 which subdivides the fuel into equal portions and supplies it to the individual fuel lines 5 via check valves 12a. The total rate of fuel flow is governed by a bypass valve 12 which recirculates liquid fuel back to the inlet of pump 10. The actual rate of fuel flow is sensed by the speed of a toothed wheel 13 in conjunction with a magnetic reluctance sensor 14 and compared to a liquid flow command signal (LFC) sent to bypass valve 12 via line 15.

It remains to note that a back-up motor-driven pump 16 is provided which may be isolated by valves 17.

The source of gaseous fuel is the LNG cargo "boil-off" in the spaces 20 above the LNG liquid cargo. The flow rate availability of this gas is dependent upon a great many factors, primarily temperature. The gas from space 20 is supplied under pressure to a gas accumulator 21 by means of a separately regulated compressor system shown generally at 22. A cryogenic reciprocating compressor 23 pumps gas from an inlet line 24 to an outlet line 25 and also through a recirculating line 26, the recirculating flow rate being set by a control valve 27. Sensors 28, 29 measure discharge and suction pressure, respectively, and are supplied to a pressure regulator 30 which positions recirculation valve 27. Through this arrangement, gas pressure in accumulator 21 is prevented from rising above a selected pressure when excess gas is generated in spaces 20 above the LNG cargo, but which supplies the full gas flow available by closing circulation valve 27 when accumulated pressure is below this value.

The gas fuel from accumulator 21 is filtered at 31, flows through an emergency gas fuel stop valve 32 and the flow rate is then governed in accordance with the position of a gas flow control servo valve 33.

The setting of the pressure regulator 30 is of a sufficient magnitude to cause gas flow through the control valve 33 to be above sonic velocity, thereby insuring that the stroke of the valve is proportional to the actual flow of gas through the valve.

The actual position of the valve 33 is sensed by a transducer 34. Also, the pressure of the gas ahead of valve 33 is sensed by a pressure transducer 35.

The dual fuel control system, which is the subject of the present invention, is indicated generally at 36 and is a solid-state analog electronic system which receives a signal from a fuel command control 37 representative of a desired rate of total fuel flow based on the gas turbine requirements. The dual fuel control 36 accepts appropriate logic signals determining the mode of control in accordance with the setting of a dual fuel selector switch 38. A fuel ratio selector 39 sets the ratio between fuels when operating in a selected ratio mode.

SIMPLIFIED VERSION OF DUAL FUEL CONTROL

Figure 2:
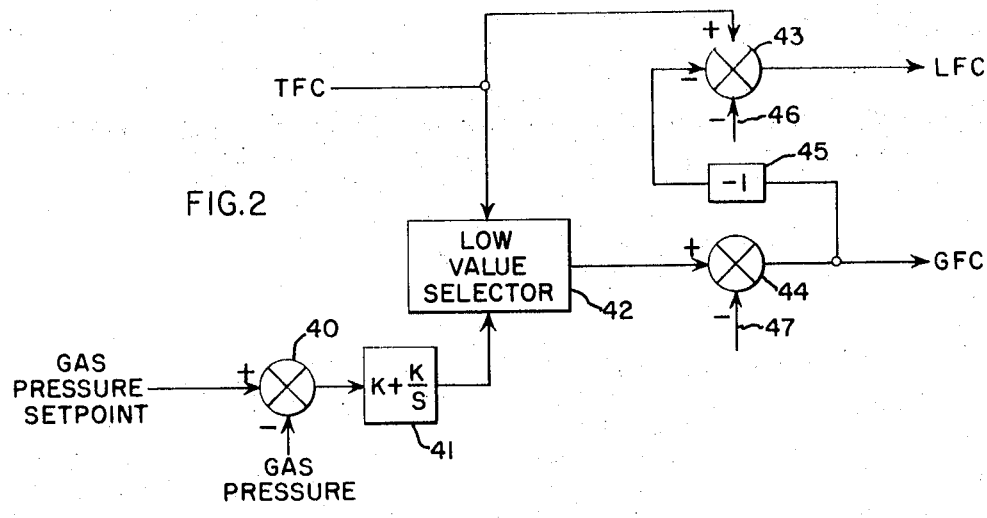
Figure 3:
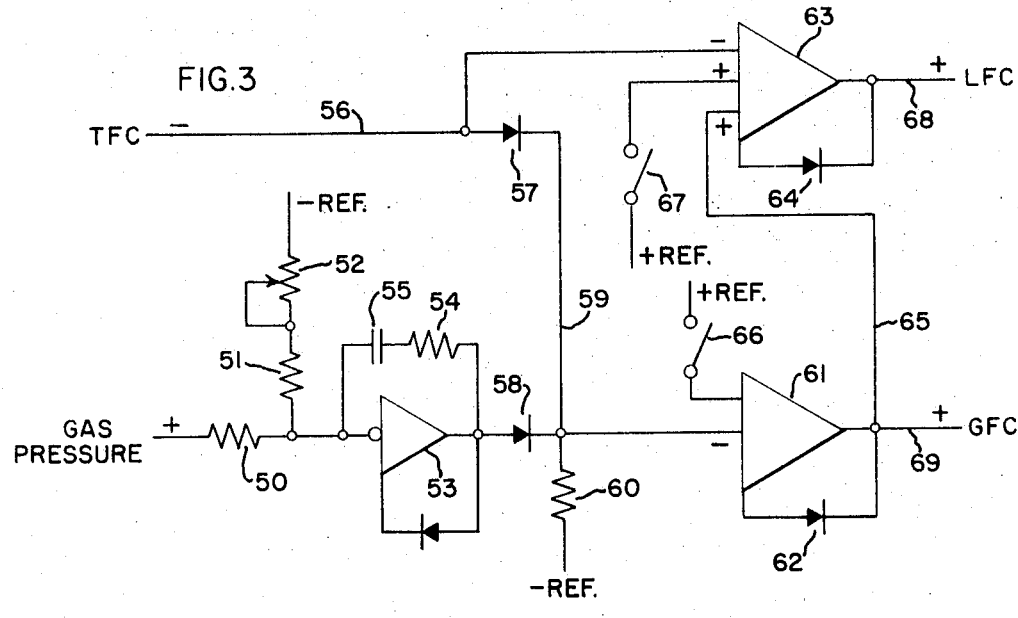

In FIGS. 2 and 3, showing the block diagram and circuit diagram, respectively, of a simplified dual fuel system, a summer 40 compares a gas pressure setpoint signal with actual gas pressure from the transducer 35 (FIG. 1). The difference or error signal is applied to a proportional plus reset amplifier indicated by the transfer function in block 41. The output from amplifier 41 is supplied to a low value selector 42 which is a gating device. Selector 42 picks the lower of two signals applied thereto and allows only the lowest valued signal to pass through.

A signal representative of the total desired fuel or total fuel command signal (TFC) is supplied as the other input to low value selector 42 and also to a summer 43. The output from the low value selector 42 is applied to another summer 44 and the output therefrom, after a sign reversal indicated at 45, is applied as a second input to summer 43. Means to supply large overriding signals to summers 43, 44 are indicated at 46, 47, respectively, with the understanding that the outputs from summers 43, 44 cannot be reduced below zero.

Although digital devices or computer programs can be used to carry out the functions of the block diagram shown in FIG. 2, the invention in its preferred form is carried out by means of analog circuitry including operational amplifiers connected in accordance with the circuit shown in FIG. 3. The signs used apply to voltages in FIG. 3 and do not correspond to the servo mechanism signal conventions used in FIG. 2.

A positive voltage proportional to gas pressure is applied to a resistance 50 and summed with a negative voltage from a constant reference source through fixed resistance 51 and adjustable resistance 52. The resulting error signal is applied to the input of an operational amplifier 53 which is only permitted to supply a negative voltage output signal. A feedback path includes resistance 54 and capacitor 55 which provide the proportional plus reset transfer function indicated in block 41 of FIG. 2.

A negative voltage proportional to a desired total fuel command is applied to lead 56. Lead 56 and the output from amplifier 53 are connected, respectively, to diodes 57, 58 whose negative terminals are connected to a common conductor 59. A negative potential from a reference source is also connected to conductor 59 through a resistance 60.

Lead 59 is connected as one input to a summing amplifier 61 with a diode 62 connected in shunt to prevent the output from becoming negative. Another summing amplifier 63 is similarly connected with diode 64. One input lead to amplifier 63 is connected to the total fuel command signal appearing on lead 56. A second lead 65 is connected between the output of amplifier 61 and the input of amplifier 63. Provisions for applying large positive voltages to the inputs of amplifiers 61, 63 are indicated symbolically by switches 66, 67, respectively. The output leads 68, 69 from the amplifiers carry voltages proportional to a desired liquid fuel command signal and gas fuel command signal, respectively.

The comparison between FIGS. 2 and 3 should be readily apparent. Amplifier 53 with feedback path 54, 55 provides proportional plus integral action as indicated in block 41 of FIG. 2. Diodes 57, 58 serve as a low value selector 42 by allowing only the smallest negative voltage to appear on lead 59. Amplifier 61 in FIG. 3 corresponds to summer 44 in FIG. 2; amplifier 63 corresponds to summer 43. Switches 66, 67 correspond to signals 46 and 47 which block any output signal from the amplifiers when closed.

OPERATION OF FIGS. 2 AND 3

Referring to the block diagram of FIG. 2, the total fuel command signal (TFC) applied to summer 43 and to the low value selector 42 represents the desired fuel flow which will give a desired power output from the gas turbine, regardless of whether the fuel supply is liquid or gaseous. It will be understood that the circuitry embodies constants of proportionality, so that the liquid fuel command signal is compatible with the gas fuel command signal in terms of their absolute sum equaling the desired total fuel command signal. In other words, a given value of LFC is modified by a selected constant of proportionality such that the rate of heat release from burning of liquid fuel flowing at a given rate is equal to a known value. An equal magnitude GFC signal is also modified, such that the rate of gas flow through the gas flow control valve will be such as to provide the same rate of heat release.

It will be recalled that in the overall system shown, the gas pressure within accumulator 21 is held within acceptable limits by the pressure regulator 30 and recirculating valve 27 so that when gas is plentifully available, the pressure in accumulator 21, as sensed by transducer 35 of FIG. 1, will remain constant. In this situation, it is desired to operate the gas turbine entirely on gaseous fuel.

On the other hand, if gas is being supplied by compressor 23 to accumulator 21 at a rate less than the total fuel consumption demand for the gas turbine, it is desired to constantly adjust the proportion between gas and liquid fuel so as to use as much gaseous fuel as possible under a continuously variable system.

Assuming that the pressure is set within the range where flow of gas is proportional to stroke of the gas fuel control valve 32, a comparison of a selected gas pressure and the actual gas pressure will produce an error signal which can be corrected by adjusting the position of the gas flow control valve. This error signal when corrected by the proportional plus integral action indicated in block 41 of FIG. 2 will produce a signal over the range of stroke of the gas fuel control valve which is indicative ov a flow rate at which there is sufficient gas fuel availability. When the gas control valve is full open, and can no longer control pressure, then the pressure regulator 30 on the compressor system prevents pressure buildup through separate action of the recirculating valve 27.

The system operates automatically in two different situations. When the total fuel command signal is less than the gas fuel availability signal, it is desired to run the gas turbine entirely on gaseous fuel. Therefore, low value selector 42 selects TFC as the lowest value and the selected signal passes through summer 44, without alteration, to become GFC. The GFC signal is also subtracted from the TFC signal in summer 43 and since the two are equal, there is a zero LFC signal.

In the other situation, where TFC exceeds the gas flow rate availability signal, the latter is selected and again passes through summer 44 to become the GFC signal. However, GFC now will rise and fall as the available gas varies. The valve stroke is accordingly adjusted to maintain pressure constant. When the pressure is held constant, this is an indication that the signal positioning the gas flow control valve can serve as a fuel command signal representing flow rate availability of the gas.

The GFC signal is subtracted from the TFC signal in summer 43 and the difference or output signal becomes the LFC signal. LFC serves to set bypass valve 12 in FIG. 1 to adjust the flow of liquid fuel to the gas turbine. The liquid usage rate therefore goes up and down as the availability and flow rate of gas fuel varies.

Application of either of the overriding signals 46, 47 (closing switches 66, 67) drives the output of the applicable summer to zero and cuts off either LFC or GFC to convert the system to a single selected fuel.

DESCRIPTION OF FIGS. 4 AND 5

Figure 4:
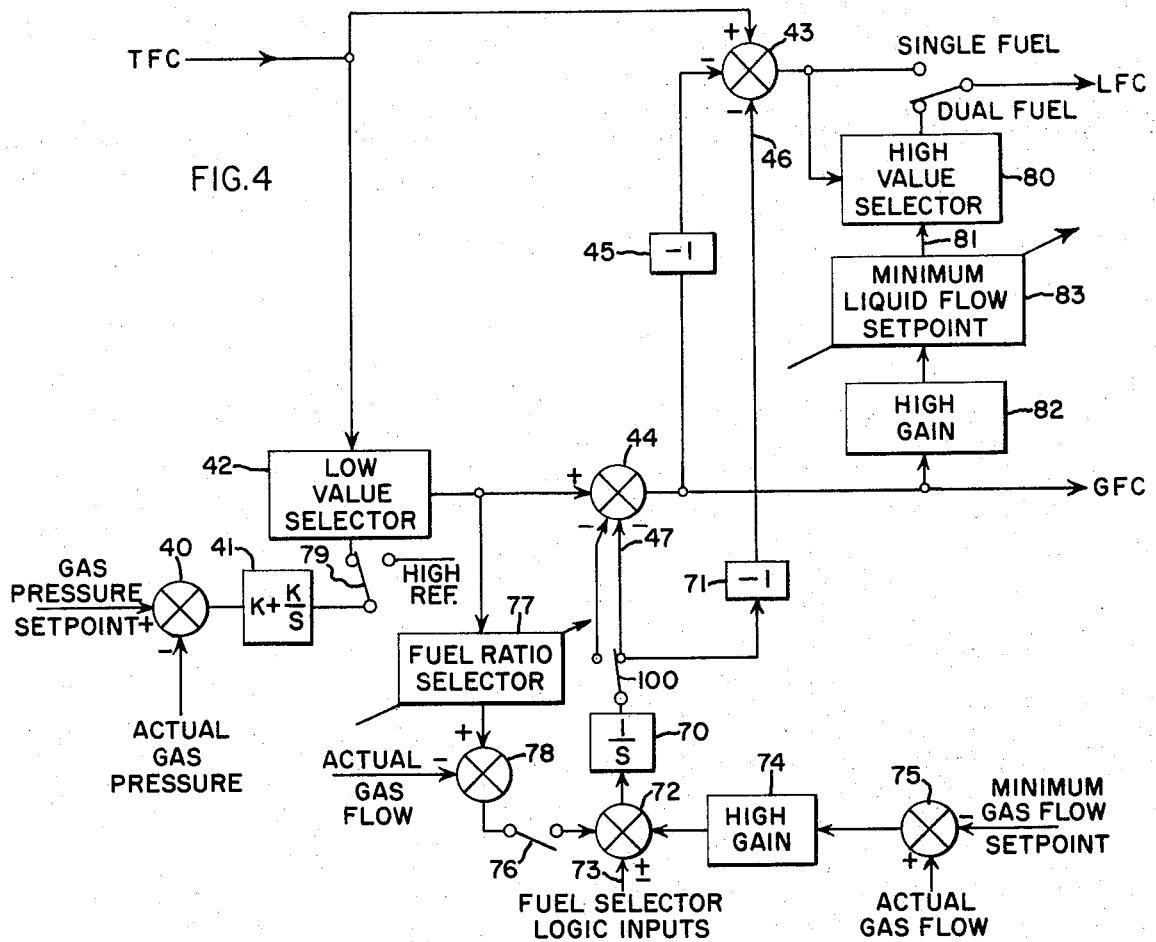
Figure 5:
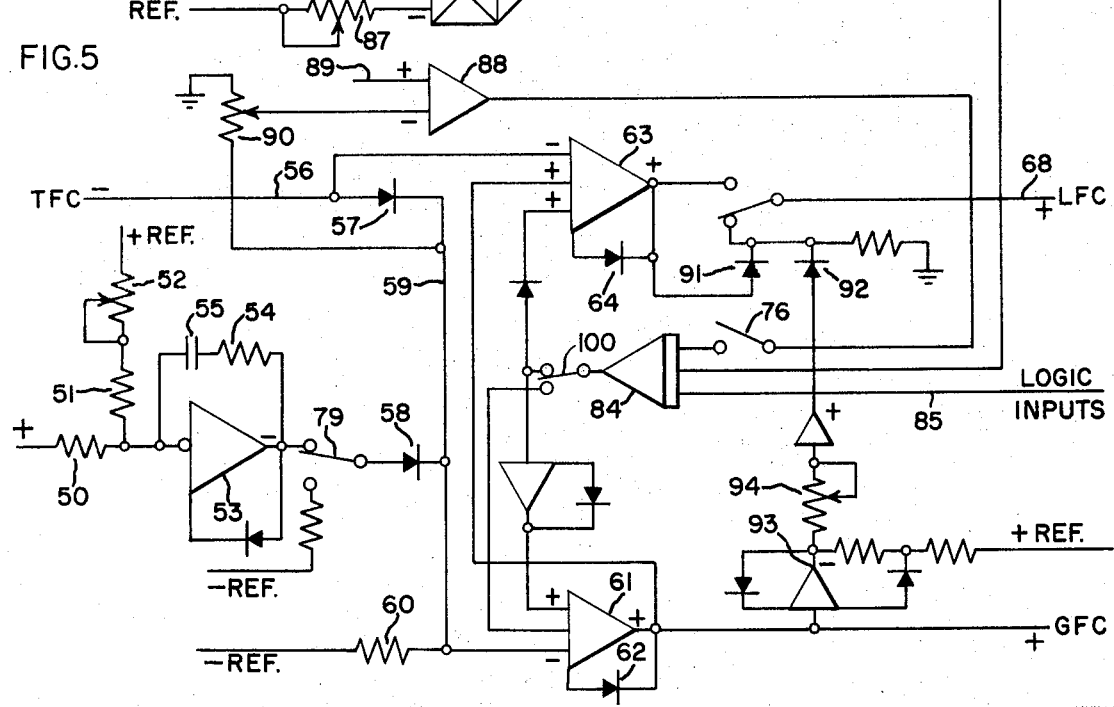

FIGS. 4 and 5 are the block diagram and circuit diagram, respectively, of the complete dual fuel system. Reference numerals corresponding to those in FIGS. 2 and 3 are used where they are identical and the following description will be confined to the added items.

In FIG. 4, the overriding signals applied at 46, 47 to summers 43, 44 are obtained from a transfer integrator shown by block 70 with the necessary sign reversal at 71. A signal applied to the input of integrator 70 will cause the integrator outputs 46, 47 (either one or the other depending upon the sign of the input signal to integrator 70) to increase, thereby forcing either LFC or GFC to zero.

The output from a summer 72 supplies the integrator 70. A first input to the summer is a logic level signal 73 which will drive one or the other of the outputs of summers 43, 44 to zero so as to operate on either fuel separately. (This signal goes to zero for a dual fuel selection when switch 76 is closed.) A second input is obtained from a high gain amplifier 74 which receives a signal from a summer 75 when actual gas flow falls below a minimum gas flow setpoint.

A third input to summer 72 when a switch 76 is closed, is obtained by comparing a selectable proportional part of the TFC signal with actual gas flow. The proportion is set by variable gain device 77 and summed with actual gas flow in summer 78. A switch 79 serves to disconnect the gas availability signal from the low value selector 42 and to impose an arbitrary high reference signal on it to cause it to select the total fuel command signal. In this manner, a proportional part of the TFC signal appears at summer 78 representing a desired GFC and is compared with the actual gas flow. As long as there is a difference, integrator 70 will act by input signal through a switch 100 to summer 44 to correct the liquid/gas ratio until it corresponds with the setting on selector 77.

Another feature is the provision for a minimum liquid fuel flow setpoint. A high value selector 80 compares the LFC signal with an input signal 81 corresponding to a minimum desired fuel flow. Therefore, when the LFC signal output from summer 43 becomes lower than the signal at 81, the latter is selected to hold LFC at a constant minimum value.

Although a constant reference signal at 81 for minimum fuel could be employed, it is desirable that the minimum liquid fuel setpoint be reduced to zero when the gas flow command signal is zero, this being essentially a single fuel system. In order to accomplish this, the setpoint signal at 81 is obtained by amplifying the GFC signal at 82 and setting a selectable part of this signal by means of gain adjustment 83. Therefore, when the system is on dual fuel primarily using gas, liquid fuel flow will not fall below the minimum selected at 83, but when the gas flow is zero, the minimum liquid flow setpoint is thus removed.

The circuit diagram corresponding to the block diagram of FIG. 4 is shown in FIG. 5. The transfer integrator is shown at 84 with three inputs. One signal appears on lead 85 corresponding to the position of the fuel selector switch. A second is obtained from the minimum gas flow comparator 86 which provides a logic level output when gas flow drops below a value set on potentiometer 87. This signal is allowed as an input to the transfer integrator only after the dual fuel mode is achieved. A third is obtained from summing amplifier 88 when switch 76 is closed. A signal representative of actual gas flow is applied to input lead 89 and the other input lead is connected to a variable impedance 90, which is the fuel ratio selector corresponding to item 77 in FIG. 4. This third input, which is used to obtain a selected fixed fuel ratio, is applied when switches 76 and 100 are shifted and the switch 79 is shifted to a high reference value. (See also FIG. 4).

The high value selector 80 in FIG. 4 is obtained in the circuit of FIG. 5 through diodes 91, 92. Diode 92 is supplied with voltage from the output of amplifier 61 via a high gain amplifier 93 and the minimum liquid fuel setpoint selected by potentiometer 94.

OPERATION OF FIGS. 4 AND 5

If it is desired to switch to either fuel in single fuel mode, the operator, through logic signals from the fuel selector, applies a positive or negative voltage to the transfer integrator which drives either LFC or GFC to zero. When in a dual fuel mode, falling of the actual gas flow below a minimum gas flow setpoint acts through the transfer integrator to reduce GFC to zero whereby LFC increases accordingly. Also, when operating in dual fuel mode, liquid flow is prevented from falling below a minimum liquid flow setpoint so that some liquid fuel is always being burned.

In the event that it is desired to operate in dual fuel at a selected fixed ratio between gas and liquid fuel, the ratio is selected by the fuel ratio selector. Switch 76 is closed, switch 79 is shifted, and the fuel selector logic input signal becomes zero. The variation of gas flow from the selected fraction of total fuel flow causes the transfer integrator to bring the LFC and GFC ratio back to that desired.

Thus, there has been shown a very flexible and comprehensive dual fuel control for a gas turbine. It is capable of operating in single fuel or dual fuel mode. In the latter type of operation, the ratio between liquid and gas fuel can be modulated continuously in accordance with the availability of the gas, or the ratio between fuels can be fixed at a selected proportion.

While the invention has been described in terms of gaseous fuel being a preferred fuel and liquid the less preferred, the invention in its broader aspects is applicable to any two fuels whether they be gas, liquid or solid. While availability of the preferred fuel is indicated herein by signals derived from a pressure measurement, any other indication of fuel availability at a given usage rate could be employed.

While there has been described herein what is considered to be the preferred embodiment of the invention, other modifications will occur to those skilled in the art, and it is desired to cover in the appended claims all such modifications as fall within the true spirit and scope of the invention.

What is claimed is:

1. A dual fuel control system for a gas turbine adapted to burn first and second fuels simultaneously, the first fuel being preferred and subject to varying availability, comprising:
    first means providing a total fuel command signal representing total fuel flow rate requirements of the gas turbine,
    second means providing a signal representing flow rate availability of said first fuel,
    third means connected to provide a first fuel command signal which is the lower of the signals from said first and second means, and
    fourth means connected to provide a second fuel command signal which is the difference between the signals from the first and second means,
    whereby said third means sets flow of the first fuel when power requirements exceed its availability while the fourth means provides the balance of fuel needed, and whereby the first means controls the flow of first fuel when total fuel requirements are less than first fuel availability.

2. The combination according to claim 1, wherein said first and second fuels are gas and liquid, respectively, and wherein said second means is a pressure controller for the first fuel, together with additional means to hold the pressure constant by varying the flow of the first fuel through a gas control valve.

3. The combination according to claim 1, and further including means to selectively cut off either said first fuel command signal or said second fuel command signal whereby the gas turbine will operate on fuel only as set by the remaining command signal.

4. The combination according to claim 1, including means for substituting a large signal for that from said second means so that the third means will select the total fuel command signal, and further including fifth means connectable to force the first fuel command signal to be a selected fraction of said total fuel command signal.

5. The combination according to claim 1, including means to block the first fuel command signal when the first fuel flow is below a selectable minimum setpoint.

6. The combination according to claim 1, further including selector means arranged to prevent the fall of the second fuel command signal below a selectable minimum flow setpoint.

7. A dual fuel control system for a marine gas turbine adapted to burn simultaneously a liquid fuel and also a gaseous fuel from the marine cargo which is subject to varying availability, said system comprising:
    a gas flow control valve controlling the flow of gas to the gas turbine in response to a gas fuel command signal,
    liuqid fuel control means controlling the flow of liquid fuel to the gas turbine in response to a liquid fuel command signal,
    means providing a total fuel command signal representing the total fuel requirements of the gas turbine,
    a pressure controller providing a signal for holding the gas pressure ahead of said gas flow control valve constant and representing flow rate availability of the gas,
    a low value selector for providing a gas fuel command signal which is the lower of either the total fuel command signal or the signal from said pressure controller, and
    a summer connected to subtract said gas fuel command signal from the total fuel command signal to provide said liquid fuel command signal.

8. The combination according to claim 7, further including transfer means to selectively reduce either the gas fuel command signal or the liquid fuel command signal in order to change the proportion between gas and liquid fuels furnished to the gas turbine.

* * * * *